United States Patent
Kamal et al.

(10) Patent No.: US 9,213,358 B2
(45) Date of Patent: Dec. 15, 2015

(54) MONOLITHIC THREE DIMENSIONAL (3D) INTEGRATED CIRCUIT (IC) (3DIC) CROSS-TIER CLOCK SKEW MANAGEMENT SYSTEMS, METHODS AND RELATED COMPONENTS

(71) Applicant: QUALCOMM Incorporated, San Diego, CA (US)

(72) Inventors: Pratyush Kamal, San Diego, CA (US); Yang Du, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/159,028

(22) Filed: Jan. 20, 2014

(65) Prior Publication Data

US 2015/0121327 A1  Apr. 30, 2015

Related U.S. Application Data (60) Provisional application No. 61/898,064, filed on Oct. 31, 2013.

(51) Int. Cl.
*G06F 17/50* (2006.01)
*G06F 1/10* (2006.01)
*H01L 27/06* (2006.01)

(52) U.S. Cl.
CPC .............. *G06F 1/10* (2013.01); *G06F 17/5081* (2013.01); *G06F 17/5031* (2013.01); *G06F 17/5068* (2013.01); *G06F 17/5072* (2013.01);
(Continued)

(58) Field of Classification Search
CPC ............ G06F 17/5031; G06F 17/5068; G06F 17/5072; G06F 17/5077; G06F 17/5081; G06F 2217/84

USPC ......... 716/110, 113, 114, 118, 119, 126, 130, 716/132, 134
See application file for complete search history.

(56) References Cited

U.S. PATENT DOCUMENTS

RE32,130 E * 4/1986 Frederickson et al. ....... 345/685
5,519,351 A * 5/1996 Matsumoto ................... 327/295
(Continued)

FOREIGN PATENT DOCUMENTS

WO      02071682 A1    9/2002

OTHER PUBLICATIONS

Co-pending U.S. Appl. No. 14/273,061, filed May 8, 2014, 33 pages.
(Continued)

*Primary Examiner* — Stacy Whitmore
(74) *Attorney, Agent, or Firm* — Withrow & Terranova, PLLC (57) ABSTRACT

Monolithic three dimensional (3D) integrated circuit (IC) (3DIC) cross-tier clock skew management systems are disclosed. Methods and related components are also disclosed. In an exemplary embodiment, to offset the skew that may result across the tiers in the clock tree, a cross-tier clock balancing scheme makes use of automatic delay adjustment. In particular, a delay sensing circuit detects a difference in delay at comparable points in the clock tree between different tiers and instructs a programmable delay element to delay the clock signals on the faster of the two tiers. In a second exemplary embodiment, a metal mesh is provided to all elements within the clock tree and acts as a signal aggregator that provides clock signals to the clocked elements substantially simultaneously.

15 Claims, 9 Drawing Sheets

(52) U.S. Cl.
CPC ......... *G06F17/5077* (2013.01); *G06F 2217/62* (2013.01); *G06F 2217/84* (2013.01); *H01L 27/0688* (2013.01)

(56) References Cited

U.S. PATENT DOCUMENTS

| | | | |
|---|---|---|---|
| 6,473,891 B1 * | 10/2002 | Shively | 716/126 |
| 6,538,957 B2 | 3/2003 | Magoshi | |
| 6,670,791 B1 * | 12/2003 | Smith et al. | 320/134 |
| 7,017,132 B2 | 3/2006 | Hou et al. | |
| 7,475,374 B1 * | 1/2009 | Johnson et al. | 716/119 |
| 7,801,718 B2 * | 9/2010 | Reddy et al. | 703/14 |
| 7,817,747 B2 | 10/2010 | Waheed et al. | |
| 7,863,960 B2 | 1/2011 | Wang et al. | |
| 7,904,860 B1 | 3/2011 | Rahut | |
| 8,176,458 B2 * | 5/2012 | Galbi et al. | 716/132 |
| 8,205,182 B1 | 6/2012 | Zlatanovici et al. | |
| 8,239,795 B2 * | 8/2012 | Ono | 716/108 |
| 8,525,569 B2 | 9/2013 | Bucelot et al. | |
| 8,832,608 B1 * | 9/2014 | Chakrabarty et al. | 716/51 |
| 8,839,178 B1 * | 9/2014 | Walsh et al. | 716/134 |
| 2002/0079937 A1 | 6/2002 | Xanthopoulos | |
| 2004/0210857 A1 * | 10/2004 | Srinivasan | 716/2 |
| 2005/0028121 A1 * | 2/2005 | Shrowty et al. | 716/10 |
| 2008/0066043 A1 * | 3/2008 | Lin | 716/13 |
| 2009/0072877 A1 | 3/2009 | Fukuoka et al. | |
| 2009/0293035 A1 * | 11/2009 | Galbi et al. | 716/16 |
| 2010/0083205 A1 * | 4/2010 | Ono | 716/6 |
| 2010/0127758 A1 * | 5/2010 | Hollis | 327/526 |
| 2012/0110538 A1 * | 5/2012 | Shih et al. | 716/129 |
| 2012/0248438 A1 | 10/2012 | Lung et al. | |
| 2014/0282336 A1 * | 9/2014 | Walsh et al. | 716/114 |

OTHER PUBLICATIONS

Co-pending U.S. Appl. No. 14/273,833, filed May 9, 2014, 29 pages.
Chen X, et al., "Adaptive Clock Distribution for 3D Integrated Circuits", IEEE 20th Conference on Electrical Performance of Electronic Packaging and Systems (EPEPS), 2011, pp. 91-94.
Non-Final Office Action for U.S. Appl. No. 14/273,061, mailed Sep. 3, 2015, 10 pages.
Non-Final Office Action for U.S. Appl. No. 14/273,833, mailed Sep. 18, 2015, 11 pages.
International Search Report and Written Opinion for PCT/US2015/025529, mailed Jun. 25, 2015, 12 pages.

* cited by examiner

MONOLITHIC THREE DIMENSIONAL (3D) INTEGRATED CIRCUIT (IC) (3DIC) CROSS-TIER CLOCK SKEW MANAGEMENT SYSTEMS, METHODS AND RELATED COMPONENTS

PRIORITY CLAIM

The present application claims priority to U.S. Patent Application Ser. No. 61/898,064 filed on Oct. 31, 2013 and entitled "MONOLITHIC THREE DIMENSIONAL (3D) INTEGRATED CIRCUIT (IC) (3DIC) CROSS-TIER CLOCK SKEW MANAGEMENT SYSTEMS, METHODS AND RELATED COMPONENTS," which is incorporated herein by reference in its entirety.

BACKGROUND

I. Field of the Disclosure

The technology of the disclosure relates generally to clock management in a three dimensional (3D) integrated circuit (IC) (3DIC).

II. Background

Mobile communication devices have become common in current society. The prevalence of these mobile devices is driven in part by the many functions that are now enabled on such devices. Demand for such functions increases processing capability requirements and generates a need for more powerful batteries. Within the limited space of the housing of the mobile communication device, batteries compete with the processing circuitry. The limited space contributes pressure to continued miniaturization of components. Likewise, the limited space available for batteries contributes pressure to reduce power consumption by the circuitry. While miniaturization and power consumption have been of particular concern in the integrated circuits (ICs) of mobile communication devices, other ICs have also been impacted.

Historically, elements within an IC have all been placed in a single two dimensional (2D) active layer with elements interconnected through one or more metal layers that are also within the IC. For more complex circuit requirements, multiple ICs are interconnected through conductors on a printed circuit board. While such circuits have generally become smaller according to Moore's Law, efforts to miniaturize ICs are reaching their limits in a 2D space and thus, design thoughts have moved to three dimensions. While there have been efforts to connect two or more ICs through a separate set of metal layers outside the IC proper, that solution is not properly a three dimensional (3D) approach. Likewise, two IC chips have been stacked one atop another with connections made between the two IC chips through solder bumps (i.e., the so called "flip chip" format). Likewise, there are system in package (SIP) solutions that stack IC chips atop one another with connections made between the chips with through silicon vias (TSVs). While arguably the flip chip and TSV embodiments represent 3D solutions, the amount of space required to effectuate a flip chip remains large. Likewise, the space required to implement a TSV relative to the overall size of the chip becomes space prohibitive if many TSVs are required. The best 3D solution to date is seen in the evolution of monolithic three dimensional ICs (3DICs).

The advent of monolithic 3DICs has provided a number of interesting possibilities in circuit design, but creates its own design issues especially as it relates to clock management. Of particular concern is clock skew, which is the time difference in the arrival of an edge of a clock signal at two different elements that rely on the clock signal (e.g., a latch or flop). Clock skew is of concern because it reduces the effective clock period available for computation. In 2D designs, clock skew arises primarily from delay created by intervening conductive paths of different lengths. Some clock skew may arise from process variations between elements. Additional clock skew may result from clock uncertainty. While an annoyance in a 2D design, such annoyances are exacerbated into legitimate problems in a 3D design. Not only may there be process variations within a single tier, there may be process variations between different tiers. Likewise, the conductive paths may have dramatically different lengths between tiers (e.g., paths on the tier with the clock source may be substantially shorter than paths that extend to another tier). Accordingly, there is a need to provide clock management regimes in 3DICs.

SUMMARY OF THE DISCLOSURE

Embodiments disclosed in the detailed description include monolithic three dimensional (3D) integrated circuit (IC) (3DIC) cross-tier clock skew management systems. Methods and related components are also disclosed. In an exemplary embodiment, to offset the skew that may result across the tiers in the clock tree, a cross-tier clock balancing scheme makes use of automatic delay adjustment. In particular, a delay sensing circuit detects a difference in delay at comparable points in the clock tree between different tiers and instructs a programmable delay element to delay the clock signals on the faster of the two tiers. In a second exemplary embodiment, a metal mesh is provided to all elements within the clock tree and acts as a signal aggregator that provides clock signals to the clocked elements substantially simultaneously.

In this regard in one embodiment, a monolithic 3DIC clock tree is disclosed. The 3DIC clock tree includes at least one first clock branch of the clock tree disposed in a first 3DIC tier, the at least one first clock branch comprising a first programmable delay cell configured to receive a clock signal and generate a first delay output comprised of a first delayed clock signal based on a first control input. The 3DIC clock tree also includes at least one second clock branch of the clock tree disposed in a second 3DIC tier, the at least one second clock branch comprising a second programmable delay cell configured to generate a second delay output comprised of a second delayed clock signal based on a second control input. The 3DIC clock tree also includes a delay sense circuit positioned in at least one of the first 3DIC tier and the second 3DIC tier, the delay sense circuit comprising a first delay input coupled to the first delay output and a second delay input coupled to the second delay output, the delay sense circuit configured to generate a control input based on the difference in time arrival between the first delay input and the second delay output.

In another embodiment, a method of operating a clock tree within a 3DIC is disclosed. The method comprises generating a clock signal at a root; directing the clock signal through a first clock branch of the clock tree in a first tier of the 3DIC; and directing the clock signal through a second clock branch of the clock tree in a second tier of the 3DIC. The method also comprises receiving delayed clock signals from the first clock branch and the second clock branch at a delay sense circuit associated with at least one of the first tier or second tier of the 3DIC; generating a control input based on difference in arrival times of the delayed clock signals; and providing the control input to a first programmable delay cell in the first clock branch if the delayed clock signal from the first clock branch arrives before the delayed clock signal from the second clock branch. The method also comprises providing the control input to a second programmable delay cell in the second clock branch if the delayed clock signal from the second clock branch arrives before the delayed clock signal from the first clock branch.

In another embodiment, a monolithic 3DIC is disclosed. The 3DIC includes a metal mesh. The 3DIC also includes a first tier including at least a first clocked element, wherein the at least first clocked element is electrically connected to the metal mesh. The 3DIC also includes a second tier including at least a second clocked element, wherein the at least second clocked element is electrically connected to the metal mesh. The 3DIC also includes a clock coupled to the metal mesh such that a clock signal arrives at the metal mesh and is conveyed to the first and second clocked elements substantially concurrently.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include monolithic three dimensional (3D) integrated circuit (IC) (3DIC) cross-tier clock skew management systems. Methods and related components are also disclosed. In an exemplary embodiment, to offset the skew that may result across the tiers in the clock tree, a cross-tier clock balancing scheme makes use of automatic delay adjustment. In particular, a delay sensing circuit detects a difference in delay at comparable points in the clock tree between different tiers and instructs a programmable delay element to delay the clock signals on the faster of the two tiers. In a second exemplary embodiment, a metal mesh is provided to all elements within clock tree and acts as a signal aggregator that provides clock signals to the clocked elements substantially simultaneously.

By adding the programmable delay element, the faster of the clock signals is slowed to match the clock signal on the slower branch. By matching the clock signals, the clock skew is minimized and the overall performance of the 3DIC is improved because fewer cycles are misaligned. In particular, this arrangement helps compensate for process variations that may exist between different tiers of the 3DIC as well as smooth variations introduced by clock branches of different length. Such compensation and smoothing helps clocked elements within the circuit sample the correct portion of the data signal.

Figure 1:
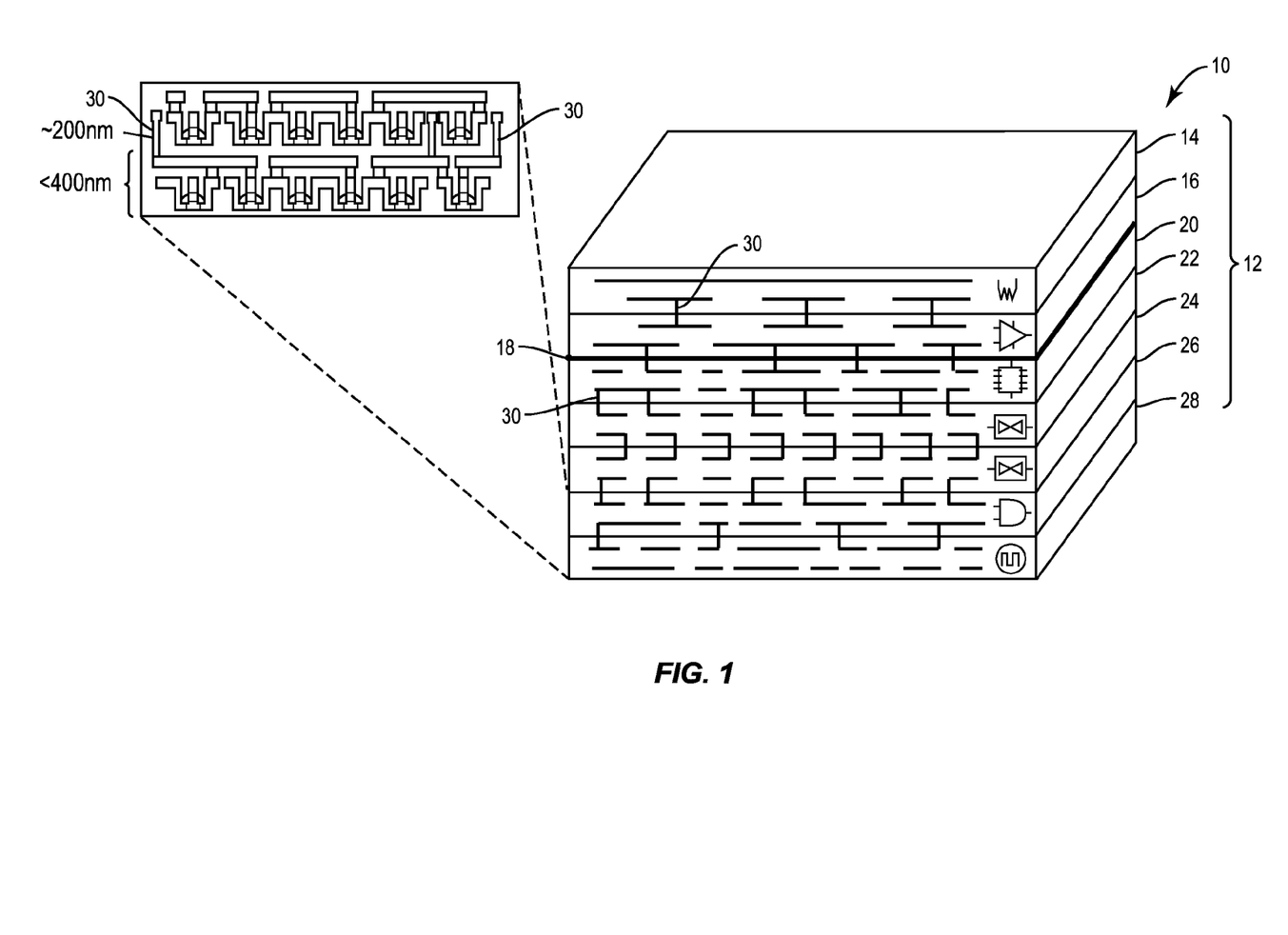
FIG. 1 is a block diagram of an exemplary three dimensional (3D) integrated circuit (IC) (3DIC) that may have clocked elements within multiple tiers.
Figure 2:
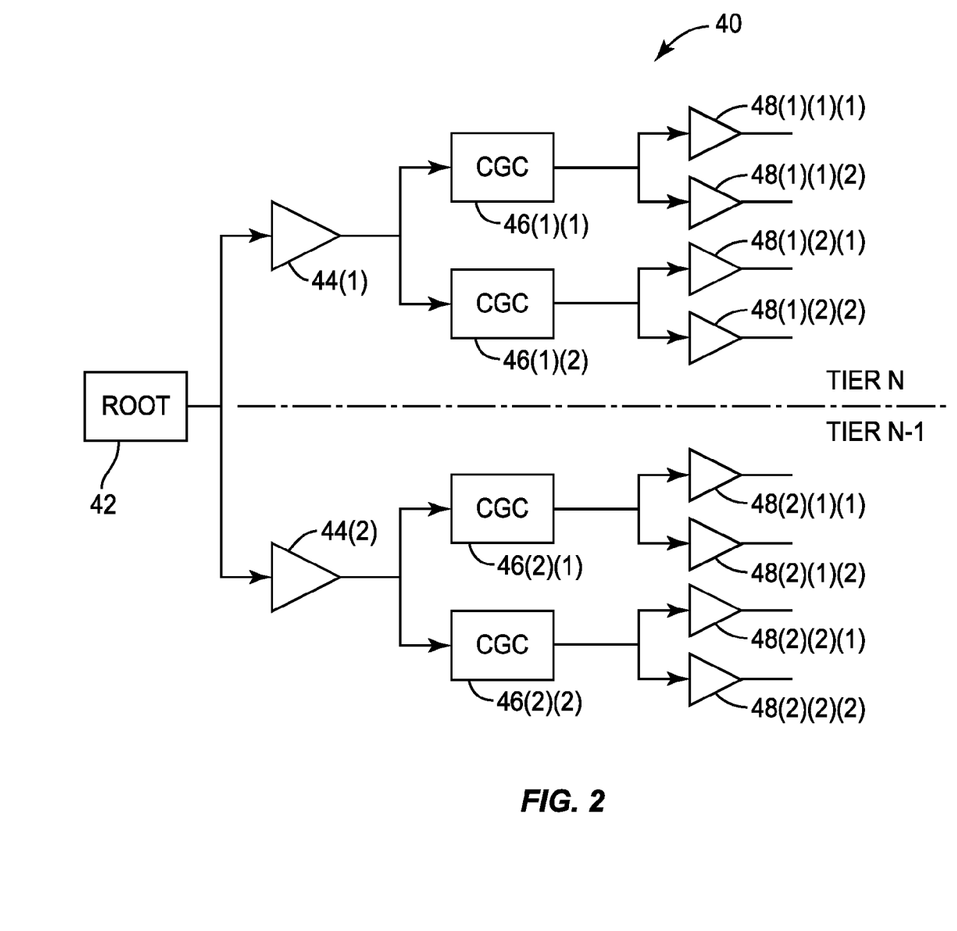
FIG. 2 is a simplified clock tree associated with the 3DIC of FIG. 1.
Figure 3:
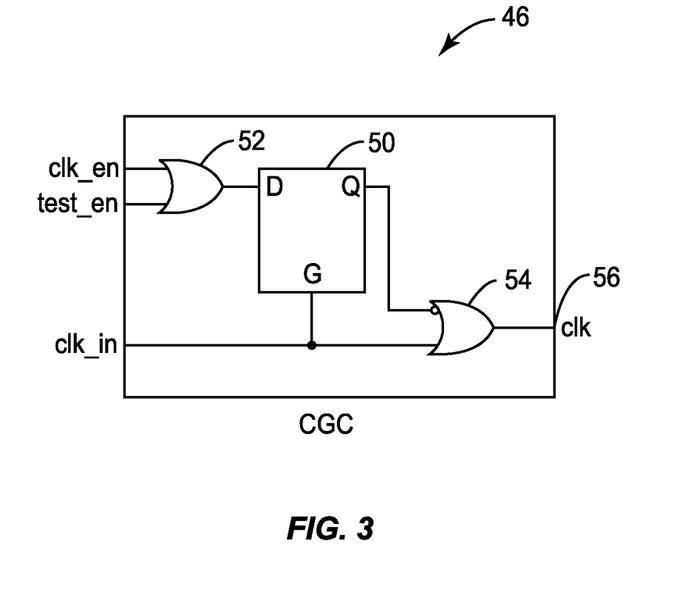
FIG. 3 is a simplified clock gating circuit (CGC) that may be used in a clock tree.
Figure 4:
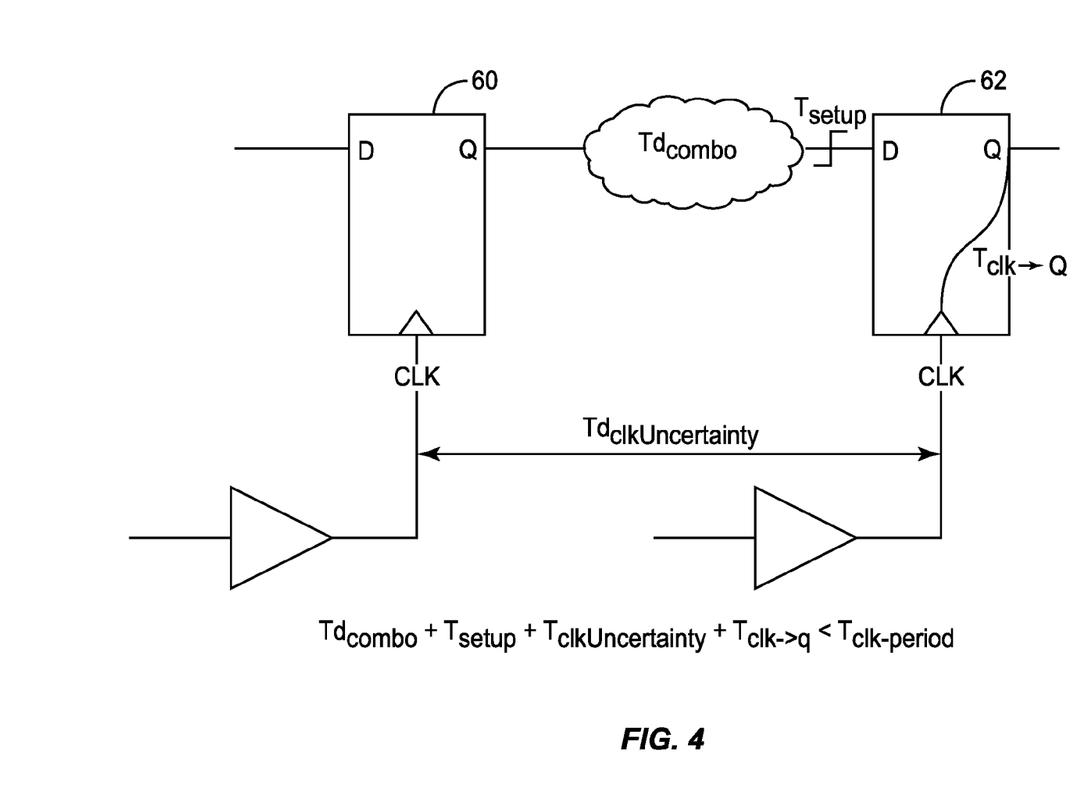
FIG. 4 is a simplified schematic of elements within a clock tree that illustrates sources of delay within the clock tree.

Before addressing the particulars of the cross-tier clock skew management systems, a brief overview of a 3DIC is provided with reference to FIG. 1 along with a discussion of clock trees in such 3DIC and sources of delay within such clock trees with reference to FIGS. 2-4. Discussion of the cross-tier clock skew management systems begins with reference to FIG. 5 below.

In this regard, FIG. 1 is a 3DIC. In particular, FIG. 1 illustrates a simplified cross-section of a 3DIC 10. The 3DIC 10 has multiple tiers 12. The tiers 12 may be formed by hydrogen cutting or other monolithic tier formation method. For more information on an exemplary hydrogen cutting process, the interested reader is referred to U.S. patent application Ser. No. 13/765,080, filed Feb. 12, 2013, which is herein incorporated by reference in its entirety.

The use of 3DIC technology allows different tiers of the tiers 12 within the 3DIC 10 to perform different functions and provide all the functions of a particular device in a single 3DIC 10. For example, the 3DIC 10 may be a radio frequency (RF) transceiver and controller for a mobile terminal. Thus, a first tier 14 includes sensors and other large feature size elements.

With continued reference to FIG. 1, a second tier 16 may include radio frequency, analog and/or power management integrated circuit (PMIC) components such as a receiver, transmitter, and duplexer/switch. The second tier 16 may be designed to be relatively low noise so that incoming RF analog signals are not distorted.

With continued reference to FIG. 1, an electromagnetic (EM) shield 18 may be positioned between the second tier 16 and a third tier 20. The EM shield 18 may be formed from a conductive material such as a graphene layer. For more information about graphene shields in 3DICs, the interested reader is referred to U.S. patent application Ser. No. 13/765,061, filed Feb. 12, 2013, the disclosure of which is herein incorporated by reference in its entirety.

The presence of the EM shield 18 helps prevent noise from the first and second tiers 14, 16 from affecting the low noise characteristics of the third tier 20. The third tier 20 may have a modem or other controller. To accommodate the functions on the third tier 20, the materials and design of the third tier 20 may be selected to promote a medium speed architecture.

With continued reference to FIG. 1, fourth and fifth tiers 22, 24 may be a memory bitcell array with random access memory (RAM) including dynamic RAM (DRAM), static RAM (SRAM) or the like. Both tiers 22, 24 may be designed to provide low leakage circuitry to improve the operation of the RAM.

With continued reference to FIG. 1, sixth and seventh tiers 26, 28 may be general processing unit tiers. Sixth tier 26 may include a digital signal processor (DSP) such as a baseband processor using combination logic while seventh tier 28 may include a DSP relying on sequential logic. Both tiers 26, 28 may be designed to support high speeds over concerns about leakage.

In an exemplary embodiment, the tiers are electrically intercoupled by monolithic intertier vias (MIV) 30. For more information about MIV, the interested reader is referred to "High-Density Integration of Functional Modules Using Monolithic 3D-IC Technology" by Shreedpad Panth et al. in the proceedings of the IEEE/ACM Asia South Pacific Design Automation Conference, 2013; pp. 681-686 which is hereby incorporated by reference in its entirety. In contrast to through silicon vias (TSV), MIV may be on the order of sub 100 nm in diameter (i.e., much smaller than the micron dimensions of the TSV) and 200 nm or less depth. Further, in an exemplary embodiment, each of the multiple tiers 12 may be approximately 400 nm thick or thinner. These dimensions are illustrated in the inset of FIG. 1.

As is understood, there may be numerous elements within the 3DIC 10 that require clock signals. These elements may be on any of the tiers of the 3DIC 10. While an asynchronous clock structure is possible where there are separate clocks on each tier, such an architecture is not an efficient utilization of space within the 3DIC and sharply limits the utility of the 3DIC to implementations that do not require synchronous processing. Accordingly, a single clock may generate a single clock signal that is routed to the various elements within the 3DIC 10. The routing of the clock signal may be abstracted from the actual conductive paths as a clock tree.

In this regard, FIG. 2 is a depiction of such an abstract clock tree 40 for the 3DIC 10. The root 42 is the clock source, which in an exemplary embodiment, may be a phase locked loop (PLL) as is well understood. As the clock signal passes through elements, the clock signal may be split, repeated, amplified, regenerated, or otherwise processed as is well understood. As illustrated, the signal from the root 42 is split between two first generation elements 44(1) and 44(2). The signals first generation elements 44(1) and 44(2) are split and provided to clock gating circuits (CGC) 46(1)(1), 46(1)(2) and 46(2)(1), 46(2)(2). An exemplary CGC 46 is provided in FIG. 3. The signals are split from the CGC 46 into second generation elements 48(1)(1)(1), 48(1)(1)(2) . . . and so on up to 48(2)(2)(2).

In this regard, FIG. 3 illustrates CGC 46 with a latch 50 that receives a data input D, and a clock input G and provides an output Q. An OR gate 52 selects the input to provide to the data input D and an OR gate 54 selects between the output Q and the clock signal to provide a clock output 56 as is well understood. Other circuits may be used for CGC 46 as is well understood.

It should be appreciated that FIG. 2 is a very simplified version of a clock tree with symmetrical splits on the branches and identical leaves. In reality, the paths (branches) to the various leaves of the clock tree may be of different length and/or have different numbers of elements 44, 48 between the root 42 and the leaf. Thus, the delay between various elements of the clock tree 40 may vary. Furthermore, there may be process variations that arise between different elements 44, 48. While a certain amount of process variation exists within a single tier of active components, even greater process variations may exist between elements on different tiers of a 3DIC 10. Such process variations are sometimes referred to as a clock uncertainty factor ($T_{clkUncertainty}$).

In this regard, FIG. 4 provides a simplified schematic that summarizes the sources of delay between different elements within a clock tree. That is, a clock signal (CLK) arrives at a first element 60 and a second element 62, which, in an exemplary embodiment are both flip-flops. The data signal at the input of the first flip-flop, element 60 will eventually pass through to the input of the second flip-flop, element 62 through a combinatorial cloud. For this data to be captured correctly at the output of the second element 62, the data needs to arrive at the input of the second element 62 within a setup time window. This arrival constraint generates the simple mathematical constraint of $Td_{combo} + T_{setup} + T_{clkUncertainty} + T_{clk \rightarrow Q} < T_{clk\text{-}period}$; where $Td_{combo}$ is the signal delay through the combinatorial cloud, $T_{setup}$ is the flip-flop setup time of the second element 62, $T_{clk \rightarrow q}$ is the clock to Q delay of the second element 62 clock input to data output delay, and $T_{clk\_uncertainty}$ is the uncertainty between the clock arrival time between the two elements 60 and 62.

While the $T_{clk\_uncertainty}$ associated with a single tier cannot be reduced to zero due to local variation, the added uncertainty due to the global variation between the two tiers can be addressed through the use of delay adjustment through one of the clock trees embodied within one of the two tiers.

Figure 5:
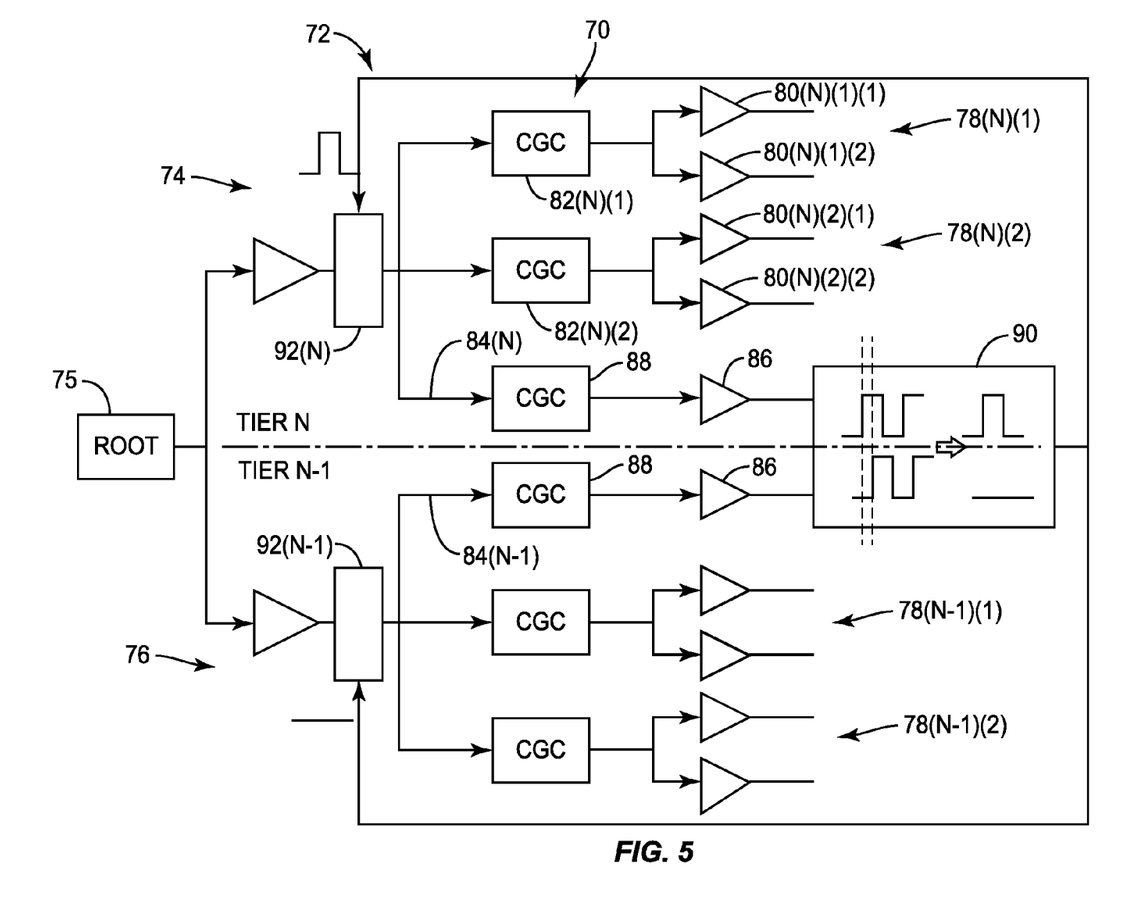
FIG. 5 is a clock tree with an exemplary embodiment of a delay correction circuit according to the present disclosure.

A first exemplary embodiment of a clock tree with delay sensing elements and corrective programmable delay elements is provided with reference to FIG. 5. In particular, clock tree 70 is illustrated within a 3DIC 72. The 3DIC 72 has at least two tiers 74, 76 (tiers N and N−1 respectively). The clock tree 70 includes a root 75, similar to root 42. Root 75 may include a PLL or other clock element as is well understood. Clock tree 70 includes traditional clock branches 78, labeled 78(N)(1) and 78(N)(2) for tier 74 and 78(N−1)(1) and 78(N−1)(2) for tier 76. Each clock branch 78 has one or more clocked elements 80 (labeled according to which branch 78 within which it is found (e.g., clocked element 80(N)(2)(2) can be found in clock branch 78(N)(2))) and/or CGC 82. Further, each tier 74, 76 includes a respective "dummy" branch 84(N), 84(N−1). Note that within a tier (e.g., tier 74, 76), the place at which the clock signal originates may also be considered a root. The terms "tier root" or "clock branch root" refer to this place. Each dummy branch 84 includes one or more clocked elements 86 and/or CGC 88 that collectively make the time delay of the dummy branch 84 equal to the longest time delay of any clock branch 78 on the corresponding tier 74, 76 (i.e., dummy branch 84(N) has a time delay equal to the longer of clock branches 78(N)(1) and 78(N)(2)). The dummy branches 84(N) and 84(N−1) both feed to a delay sense circuit 90 that detects the delay between clock edges as they arrive at the delay sense circuit 90. In an exemplary embodiment, the delay sense circuit 90 spans or crosses both tiers 74, 76. In an exemplary embodiment, the delay sense circuit 90 spans two adjacent tiers and provides a feedback signal to a programmable delay cell 92 in each tier (i.e., programmable delay cell 92(N) and 92(N−1)). While the delay sense circuit 90 is illustrated as spanning two adjacent tiers, it should be appreciated that the delay sense circuit 90 may be entirely within a single tier, but operatively coupled to the dummy branch 84 of a second tier. By virtue of placement proximate the tier root, the respective programmable delay cell 92 adds delay to all elements within that tier 74, 76 so that the difference in arrival times of clock edges is driven to approximately zero. Where there are more than two tiers in the 3DIC 10 a priority may be created between different delay sense circuits 90. For example, there may be a first delay sense circuit 90 between first and second tiers 14, 16 and a second delay sense circuit 90 between second and third tiers 16, 20. The programmable delay cell 92 in the second tier 16 prioritizes signals from the first delay sense circuit 90 and this in turn forces the second delay sense circuit 90 to move the third programmable delay cell 92 to match the delay in the second tier. Other prioritization/conflict resolution schemes may also be implemented.

Figure 6:
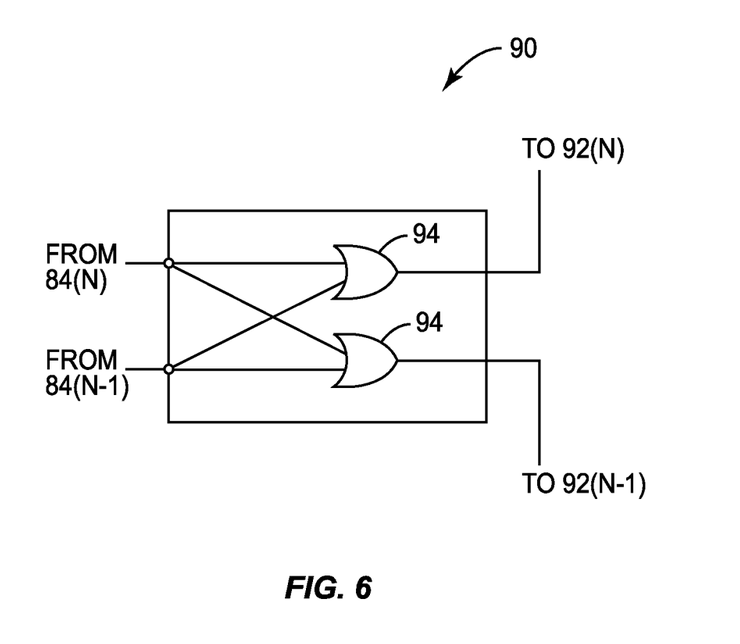
FIG. 6 is an exemplary delay sense circuit such as may be used with the clock tree of FIG. 5.

FIG. 6 illustrates an exemplary delay sense circuit 90. Delay sense circuit 90 includes two OR gates 94, 96 that are cross coupled with the inputs from dummy branches 84(N), 84(N−1) and collectively generate the feedback signals that are passed to the respective programmable delay cell 92. Other delay sense circuitry may be used without departing from the scope of the present disclosure.

By using the programmable delay cell 92, clock skew is minimized and performance is improved. However, other techniques may be used to minimize clock skew in a 3DIC 10.

Figure 7:
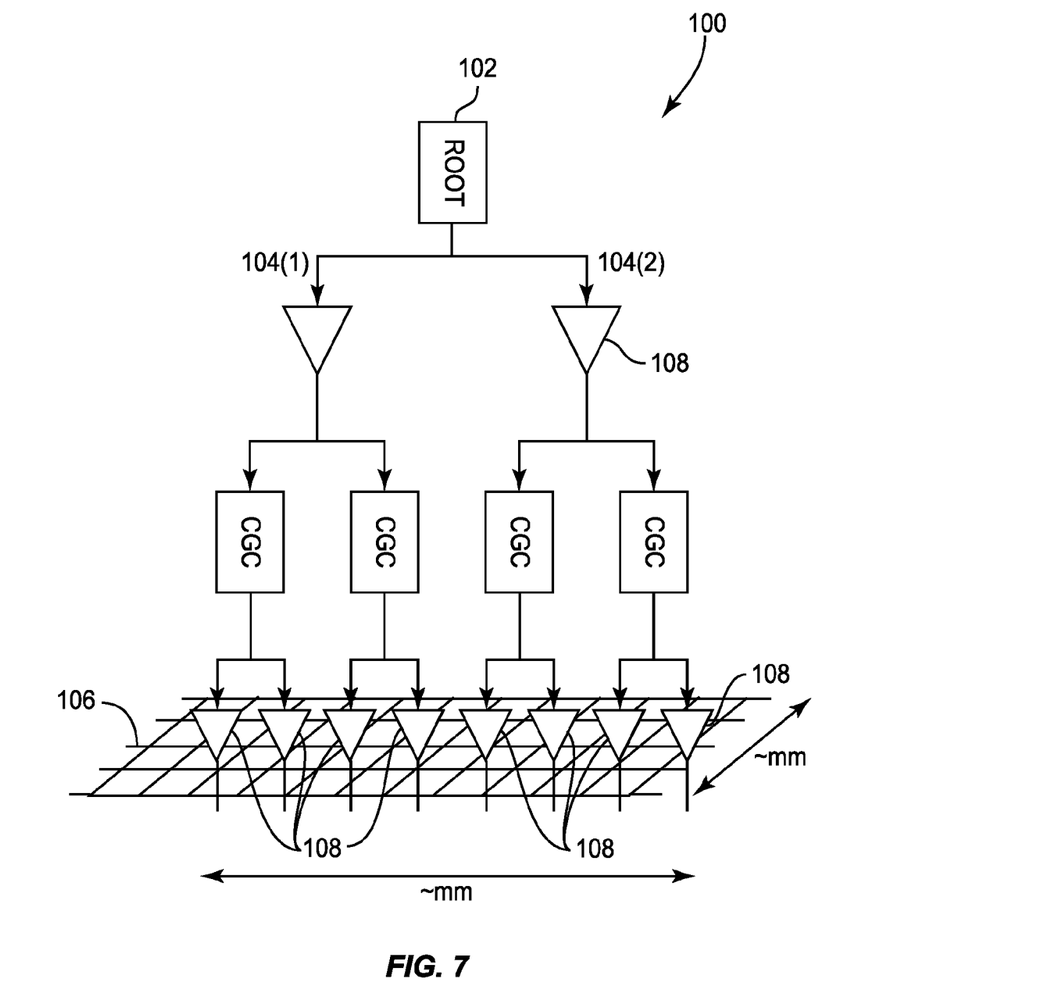
FIG. 7 is an exemplary clock tree for a two dimensional (2D) circuit with a metal mesh that fails to correct for delay within the clock tree.
Figure 8:
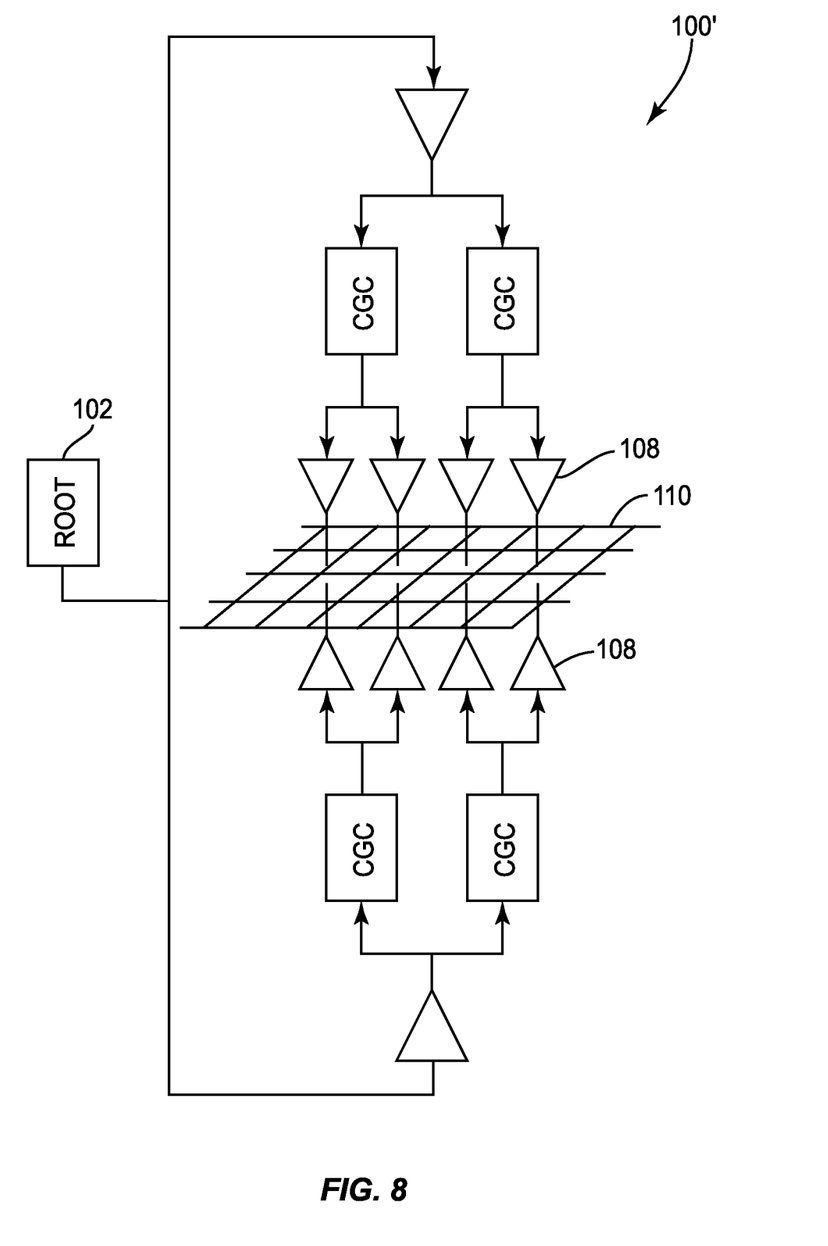
FIG. 8 is a clock tree for a 3DIC with a metal mesh that acts to correct delay within the clock tree.

For example, tying the clocked elements to a metal mesh may result in simultaneous clock signal arrival. FIG. 7 explores a 2D situation and FIG. 8 illustrates a 3D embodiment.

In this regard, FIG. 7 is a clock tree 100 that has a root 102 and one or more branches 104 (104(1), 104(2) shown). Each branch 104 has a termination on a metal mesh 106 that is coupled to clocked elements 108. As the clock signals arrive on the metal mesh 106, the metal mesh 106 acts as a capacitor such that when enough clock signals arrive, the capacitor is charged and presents a signal at the clocked elements 108 at substantially the same time. However, in a 2D setting, the capacitance is relatively large and the various clocked signals are not powerful enough to charge the capacitor adequately.

In contrast to the failed capacitive structure of FIG. 7, in a 3DIC 10, a metal mesh may be used to greater effect. In this regard, FIG. 8 illustrates a clock tree 100' having metal mesh 110 for use in the 3DIC 10. The metal mesh 110 may be positioned between the tiers of the 3DIC 10. Because the metal mesh 110 is shared by the tiers, the footprint of the metal mesh 110 is smaller than a 2D metal mesh 106 that is coupled to a comparable number of clocked elements 108. For example, if a 2D metal mesh 106 was coupled to ten clocked elements 108 and took up space accordingly, the equivalent 3D metal mesh 110 would be half that size since half of the clocked elements 108 may be beneath the metal mesh 110 and half of the clocked elements 108 may be above the metal mesh 110. Alternatively, if the footprint is the same size, there are potentially twice as many clocked elements 108 feeding a clock signal to the metal mesh 110. The smaller size to clocked elements 108 ratio reduces the relative capacitance of the metal mesh 110 and allows the clocked signals to be sufficient to charge the capacitor such that the metal mesh 110 provides the clock signal at substantially the same time to all the clocked elements 108.

The 3DIC 10 according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
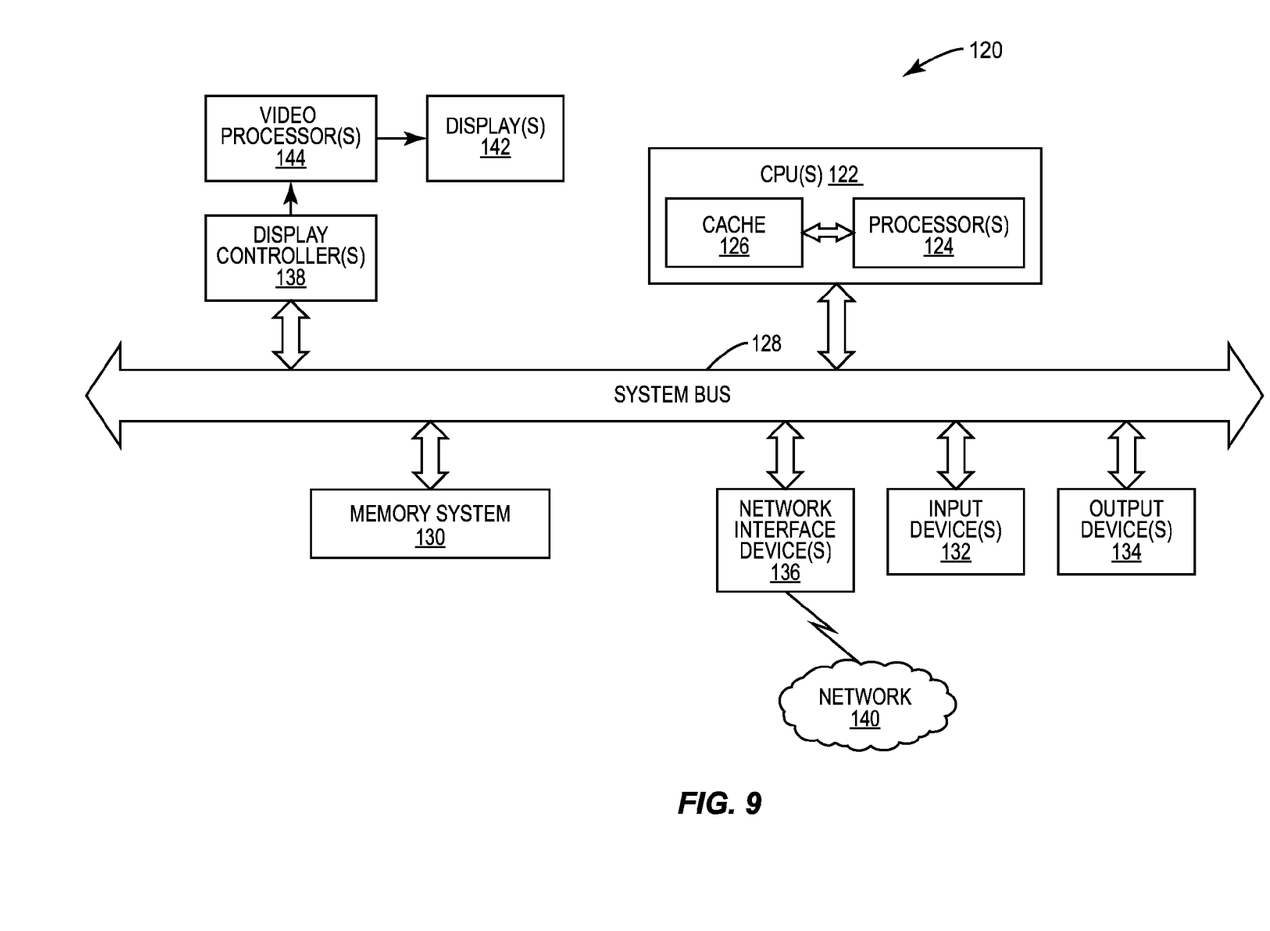
FIG. 9 is a block diagram of an exemplary processor-based system that can include the delay corrected clock trees of FIG. 5 or 8.

In this regard, FIG. 9 illustrates an example of a processor-based system 120 that can employ 3DIC 10 with the clock tree management schemes illustrated in FIG. 5 or 8. In this example, the processor-based system 120 includes one or more central processing units (CPUs) 122, each including one or more processors 124. The CPU(s) 122 may have cache memory 126 coupled to the processor(s) 124 for rapid access to temporarily stored data. The CPU(s) 122 is coupled to a system bus 128 and can intercouple devices included in the processor-based system 120. As is well known, the CPU(s) 122 communicates with these other devices by exchanging address, control, and data information over the system bus 128. For example, the CPU(s) 122 can communicate bus transaction requests to the memory system 130.

Other devices can be connected to the system bus 128. As illustrated in FIG. 6, these devices can include a memory system 130, one or more input devices 132, one or more output devices 134, one or more network interface devices 136, and one or more display controllers 138, as examples. The input device(s) 132 can include any type of input device, including but not limited to input keys, switches, voice processors, etc. The output device(s) 134 can include any type of output device, including but not limited to audio, video, other visual indicators, etc. The network interface device(s) 136 can be any devices configured to allow exchange of data to and from a network 140. The network 140 can be any type of network, including but not limited to a wired or wireless network, private or public network, a local area network (LAN), a wide local area network (WLAN), and the Internet. The network interface device(s) 136 can be configured to support any type of communication protocol desired.

The CPU(s) 122 may also be configured to access the display controller(s) 138 over the system bus 128 to control information sent to one or more displays 142. The display controller(s) 138 sends information to the display(s) 142 to be displayed via one or more video processors 144, which process the information to be displayed into a format suitable for the display(s) 142. The display(s) 142 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A monolithic three dimensional (3D) integrated circuit (IC) (3DIC) clock tree, comprising:
    at least one first clock branch of a clock tree disposed in a first 3DIC tier, the at least one first clock branch comprising a first single programmable delay cell configured to receive a clock signal and generate a first delay output comprised of a first delayed clock signal based on a first control input;
    a first plurality of clocked elements disposed in the first 3DIC tier, the first plurality of clocked elements coupled to the first delay output;
    at least one second clock branch of the clock tree disposed in a second 3DIC tier, the at least one second clock branch comprising a second single programmable delay cell configured to generate a second delay output comprised of a second delayed clock signal based on a second control input;
    a second plurality of clocked elements disposed in the second 3DIC tier, the second plurality of clocked elements coupled to the second delay output; and
    a delay sense circuit positioned in at least one of the first 3DIC tier and the second 3DIC tier, the delay sense circuit comprising a first delay input coupled to the first delay output through the first plurality of clocked elements and a second delay input coupled to the second delay output through the second plurality of clocked elements, the delay sense circuit configured to generate a control input based on a difference in time arrival between the first delay input and the second delay output.

2. The 3DIC of claim 1, wherein the first plurality of clocked elements comprises at least one flip-flop.

3. The 3DIC of claim 1, wherein the delay sense circuit spans both the first and second 3DIC tiers.

4. The 3DIC of claim 1, wherein the at least one first clock branch comprises a dummy branch and one or more traditional clock branches.

5. The 3DIC of claim 1, wherein the first delay input is coupled to the first delay output indirectly through one or more clocked elements of a dummy branch.

6. The 3DIC of claim 1, further comprising a root with a clock source.

7. The 3DIC of claim 1, wherein the delay sense circuit comprises two cross coupled OR gates.

8. The 3DIC of claim 1, wherein the first single programmable delay cell is positioned proximate a clock branch root.

9. The 3DIC of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

10. A method of operating a clock tree within a three dimensional (3D) integrated circuit (IC) (3DIC), the method comprising:
    generating a clock signal at a root;
    directing the clock signal through a first clock branch of a clock tree including through a first plurality of clocked elements in a first tier of a 3DIC;
    directing the clock signal through a second clock branch of the clock tree including through a second plurality of clocked elements in a second tier of the 3DIC;
    receiving delayed clock signals from the first clock branch and the second clock branch at a delay sense circuit associated with at least one of the first tier or the second tier of the 3DIC;
    generating a control input based on difference in arrival times of the delayed clock signals;
    providing the control input to a first programmable delay cell in the first clock branch if the delayed clock signal from the first clock branch arrives before the delayed clock signal from the second clock branch; and
    providing the control input to a second programmable delay cell in the second clock branch if the delayed clock signal from the second clock branch arrives before the delayed clock signal from the first clock branch.

11. The method of claim 10, wherein directing the clock signal through the first clock branch comprises directing the clock signal through one or more flip-flops.

12. The method of claim 10, wherein receiving delayed clock signals at the delay sense circuit comprises receiving delayed clock signals at a delay sense circuit associated with both the first tier and second tier of the 3DIC.

13. The method of claim 10, wherein directing the clock signal through the first clock branch of the clock tree comprises directing the clock signal through a dummy branch and a traditional branch within the first clock branch.

14. The method of claim 10, wherein receiving the delayed clock signals at the delay sense circuit comprises receiving the delayed clock signals at two cross-coupled OR gates.

15. The method of claim 10, wherein providing the control input to the first programmable delay cell comprises providing the control input to a programmable delay cell proximate a tier root.

* * * * *